United States Patent
Hirozawa et al.

(10) Patent No.: US 9,764,291 B2
(45) Date of Patent: Sep. 19, 2017

(54) SPIRAL SEPARATION MEMBRANE ELEMENT AND METHOD FOR PRODUCING SAME

(75) Inventors: Hiroho Hirozawa, Otsu (JP); Hiroshi Umetani, Otsu (JP); Masakazu Koiwa, Otsu (JP); Kentarou Takagi, Otsu (JP); Masahiro Kimura, Otsu (JP)

(73) Assignee: Toray Industries, Inc. (JP)

( * ) Notice: Subject to any disclaimer, the term of this patent is extended or adjusted under 35 U.S.C. 154(b) by 449 days.

(21) Appl. No.: 14/008,050

(22) PCT Filed: Mar. 23, 2012

(86) PCT No.: PCT/JP2012/057464
§ 371 (c)(1),
(2), (4) Date: Sep. 27, 2013

(87) PCT Pub. No.: WO2012/133153
PCT Pub. Date: Oct. 4, 2012

(65) Prior Publication Data
US 2014/0014569 A1    Jan. 16, 2014

(30) Foreign Application Priority Data
Mar. 29, 2011   (JP) .................... 2011-071952

(51) Int. Cl.
*B01D 63/10* (2006.01)
*B01D 67/00* (2006.01)
*B01D 65/00* (2006.01)

(52) U.S. Cl.
CPC ........... *B01D 63/10* (2013.01); *B01D 63/103* (2013.01); *B01D 65/003* (2013.01); *B01D 67/00* (2013.01); *B01D 2313/04* (2013.01)

(58) Field of Classification Search
CPC .. B01D 63/10; B01D 2313/04; B01D 63/103; B01D 65/003; B01D 2313/143; B01D 67/00
See application file for complete search history.

(56) References Cited

U.S. PATENT DOCUMENTS 3,367,504 A    2/1968   Westmoreland
4,475,973 A *  10/1984  Tanaka ................ B01D 63/10
                                                    156/184
(Continued)

FOREIGN PATENT DOCUMENTS

| EP | 0 819 466 | 1/1998 |
| JP | 44-14216 | 6/1969 |

(Continued)

OTHER PUBLICATIONS

English translation Japanese Patent Application No. 2010-099590 (Jun. 2010).*

(Continued)

*Primary Examiner* — John Kim
(74) *Attorney, Agent, or Firm* — DLA Piper LLP (US)

(57) ABSTRACT

A spiral separation membrane element including a plurality of separation membrane pairs wound around the outer peripheral surface of a water collection pipe, wherein the plurality of separation membranes include at least two sets of separation membrane pairs in which two adjacent separation membranes are stacked such that the water supply sides of the separation membranes form opposing surfaces, and the water supply-side surfaces at the ends of separation membranes close to the water collection pipe and parallel to the lengthwise direction of the water collection pipe are sealed by a sealing material.

8 Claims, 2 Drawing Sheets

(56) References Cited

U.S. PATENT DOCUMENTS

| | | | |
|---|---|---|---|
| 6,068,771 A | 5/2000 | McDermott et al. | |
| 6,533,937 B1* | 3/2003 | Adachi | B01D 61/02 210/257.2 |
| 7,335,301 B2 | 2/2008 | Cheng | |
| 2004/0099598 A1* | 5/2004 | Cheng | B01D 63/10 210/321.85 |
| 2007/0068864 A1* | 3/2007 | Cruz | B01D 65/003 210/321.76 |
| 2010/0140161 A1 | 6/2010 | Haynes et al. | |

FOREIGN PATENT DOCUMENTS

| | | |
|---|---|---|
| JP | 04-011928 | 1/1992 |
| JP | 05-123545 | 5/1993 |
| JP | 11-114381 | 4/1999 |
| JP | 11-226366 | 8/1999 |
| JP | 2006-507117 | 3/2006 |
| JP | 2006-136839 | 6/2006 |
| JP | 2006-247453 | 9/2006 |
| JP | 2008-302344 | 12/2008 |
| JP | 2010-099590 | 5/2010 |
| WO | 93/10889 | 6/1993 |
| WO | 2011/005657 | 1/2011 |

OTHER PUBLICATIONS

Notification of Reasons for Refusal dated Jan. 12, 2016 of corresponding Japanese Application No. 2012-515277, along with an English translation.
Supplementary European Search Report dated Jan. 26, 2015 of corresponding European Application No. 12764950.7.
European Office Action dated Oct. 14, 2015 of corresponding European Application No. 12764950.7.
Decision to Refuse dated Mar. 13, 2017, of corresponding European Application No. 12764950.7.
Minutes of the Oral Proceedings dated Mar. 9, 2017, of corresponding European Application No. 12764950.7.
Summons to Attend Oral Proceedings dated Sep. 30, 2016, from the corresponding European Application No. 12764950.7.

* cited by examiner

SPIRAL SEPARATION MEMBRANE ELEMENT AND METHOD FOR PRODUCING SAME

TECHNICAL FIELD

This disclosure relates to a spiral separation membrane element adapted for use in separating components in a fluid such as liquid or gas. The disclosure also relates to a method of producing a spiral separation membrane element which can be used in producing a spiral separation membrane element.

BACKGROUND

Various methods have been proposed for the separation of components included in liquid, gas, and other fluids. For example, spiral separation membrane elements are widely used for the removal of ionic substance in sea water, brackish water, and the like. Exemplary separation membranes used in a spiral separation membrane element include microfiltration membrane, ultrafiltration membrane, nanofiltration membrane, reverse osmosis membrane, and forward osmosis membrane. These separation membranes are used, for example, in the production of drinking water from sea water, brackish water, water containing toxic substances, and the like, as well as in the production of commercial-scale ultra-pure water, wastewater treatment, and recovery of valuables. The separation membranes used are selected depending on the target component to be separated as well as the separation performance.

Spiral separation membrane elements are used by supplying raw fluid to one surface of a separation membrane and obtaining permeate fluid from the other surface. One merit of the spiral separation membrane elements is the large separation membrane area compared with other separation membrane elements.

A spiral separation membrane element comprises a wound body formed by spirally wound separation membranes, an upstream end plate fitted on one end of the wound body, a downstream end plate fitted on the other end of the wound body, a raw fluid channel along one surface of the separation membrane and a permeate fluid channel on the other surface of the separation membrane, and a permeate fluid collection tube, wherein the wound body is formed by spirally winding the separation membranes around the permeate fluid collection tube with the raw fluid channel being closed to the permeate fluid collection tube and the permeate fluid channel being open to the permeate fluid collection tube, one end of the permeate fluid collection tube is closed and the other open end is located in the exterior of the downstream end plate, raw fluid is supplied into the raw fluid channel though the upstream end plate, concentrate fluid which failed to permeate through the separation membrane is discharged through the downstream end plate, and permeate fluid which has permeated through the separation membrane is discharged through the permeate fluid collection tube.

When the raw fluid is water, and the water is treated by using a spiral separation membrane element prepared by using a reverse osmosis membrane for the separation membrane, a polymer net is often used as a channel material for the formation of a channel, and provided on the feed water side of the separation membrane. The separation membrane commonly used is a compound semipermeable membrane comprising a separation functional layer of a crosslinkable high molecular weight compound such as polyamide, a porous support membrane of a high molecular weight compound such as polysulfone, and a nonwoven fabric of a high molecular weight compound such as polyethylene terephthalate disposed in this order from the feed water side to the permeate water side. A channel material is also used on the permeate water side to facilitate the flow of the permeate water along the separation membrane, and also, to prevent falling of the separation membrane into the channel and secure the flow path of the permeate water. The material often used for the channel formation is a fabric such as tricot which has a smaller channel interval smaller than the channel material on the feed water side.

For the water production apparatus using the spiral separation membrane element, improvement of the water production performance has been demanded to thereby reduce the cost of water production. To improve separation performance of the spiral separation membrane element, there have been various proposals to increase the amount of the permeate fluid produced per unit time by various improvements in the performance of the separation membrane layer which has channel members for respectively defining feed water channel and permeate water channel in the element and which is spirally wound.

For example, JP 2006-247453 A proposes a method wherein a sheet member provided with projections and depressions is used for the channel material on the permeate water side. JP 11-114381 A proposes use of a separation membrane having projections and depressions formed on the feed water side of the separation membrane and a hollow channel formed in its interior, without using any substrate (channel material) for the channel formation. JP 2010-099590 A proposes use of a sheet-form compound semipermeable membrane comprising a porous support layer having projections and depressions formed thereon and a layer having separation activity without using the channel material such as net on the feed water side or the channel material such as tricot on the permeate water side.

In the meantime, use of a plurality of separation membranes in the spiral separation membrane element with the separation membranes folded such that the surface on the feed water side opposes with the surface on the feed water side of adjacent separation membrane has been known in the art. This use of folding has enabled provision of the channel material such as a net at a relatively high precision since the channel material is sandwiched between the surfaces of the separation membranes on the feed water side. The folded separation membrane pairs are disposed one on another with the surface of on the permeate water side opposing the surface of on the permeate water side of the adjacent folded separation membrane pair, and then used for the wound body.

Each separation membrane pair has a crease (fold) on one side, and the raw fluid channel in the interior of the separation membrane pair is closed by this crease in relation to the permeate fluid collection tube. One of the sides in the direction perpendicular to the direction of the crease (one of the sides extending in the axial direction) opposes the upstream end plate and the other side of the sides in the direction perpendicular to the direction of the crease (the other one of the sides extending in the axial direction) opposes the downstream end plate to constitute the wound body. The remaining one side of the separation membrane pair is closed by adhesion.

The conventional spiral separation membrane elements as described above are not sufficient in improving their performance, particularly in improving the stability of the separation performance in the long term operation. The method proposed in JP 2006-247453 A using a sheet member having projections and depressions formed on the permeate water side for the channel material only reduces the flow resistance of the permeate water. In addition, the space allowed for the fluid flow in that method is smaller than the case of the separation membrane having the projections and depressions formed directly thereon because of the thickness occupied by sheet material itself, and therefore, the effect of reducing the flow resistance of the permeate water has been insufficient.

In the method proposed in JP 11-114381 A wherein the separation membrane has projections and depressions formed on the side of the feed water and a hollow channel formed in its interior without using the substrate, the separation membrane has the hollow channel extending in the direction parallel to the surface of the separation membrane in its interior. Accordingly, the height difference between the projections and the depressions on the surface of the separation membrane can not be increased beyond certain limit, and the shape of the projections and the depressions is also limited. Furthermore, the channel in the Examples of the JP 11-114381 A is a groove having a step height of 0.15 mm. The shape of the channel on the permeate water side is also limited, and the effect of reducing the flow resistance is insufficient in both the channel on the side of the feed water and the channel on the permeate water side.

For the method proposed in JP 2010-099590 A using a sheet-form compound semipermeable membrane comprising a porous support layer having projections and depressions formed thereon and a layer having separation activity without using the channel material such as a net on the side of feed water or the channel material such as a tricot on the side of feed water, JP 2010-099590 A does not disclose the performance when the spiral separation membrane element is actually prepared by using this sheet-form compound semipermeable membrane except for the membrane performance evaluated by using a cell for evaluating the flat membrane. When the spiral separation membrane element is operated with the pressure actually applied, both the channel on the side of the feed water and the channel on the side of the permeate water are likely to experience change in their cross-sectional area, and when this element is operated not only for a short period but for a long period, the element is likely to experience change in its performance.

In addition, when a separation membrane pair is prepared by folding the separation membrane as in the case of the prior art production, folding of the separation membrane may be insufficient, and in such a case, some space or gap is left near the crease. The resulting membrane element may suffer from fluid leakage when the spiral separation membrane element is prepared by winding such separation membrane pair around the permeation fluid collection tube. In such case, the spiral separation membrane element cannot fulfill its function.

It could therefore be helpful to provide a spiral separation membrane element which does not experience sliding between the membranes in the production of the pair of separation membranes, and which stably realizes good separation function for a long time.

We thus provide a spiral separation membrane element comprising:

(a-1) a wound body comprising spirally wound separation membrane, (a-2) a raw fluid channel provided along one surface of the separation membrane, (a-3) a permeate fluid channel provided along the other surface of the separation membrane, and (a-4) a permeate fluid collection tube; wherein (a-5) the raw fluid channel is closed to the permeate fluid collection tube, and the permeate fluid channel is open to the permeate fluid collection tube, (a-6) the separation membrane is wound around the permeate fluid collection tube to constitute the wound body, (a-7) raw fluid is supplied to the raw fluid channel from one end of the wound body, (a-8) concentrate fluid which did not permeate through the separation membrane is discharged from the other end of the wound body, and (a-9) permeate fluid which has permeated through the separation membrane is discharged from the permeate fluid collection tube, wherein (b-1) the spiral separation membrane element has at least two separation membrane pairs, and a surface in contact with the raw fluid of one separation membranes opposes a surface in contact with the raw fluid of the adjacent separation membrane to form the raw fluid channel, and the raw fluid channel between the edge portions on the side of the permeate fluid collection tube is closed by a sealing material provided on the edge portions of the separation membranes, and (b-2) the wound body is formed by spirally winding each separation membrane pair around the permeate fluid collection tube.

It is preferable that the sealing material has a width in the direction perpendicular to the axial direction of the permeate fluid collection tube of 5 mm to 100 mm.

It is preferable that the sealing material has a thickness of 5 μm to 500 μm.

It is preferable that the raw fluid channel is formed by projections and depressions formed on the surface of the separation membrane or a channel material provided along the surface of the separation membrane.

It is preferable that a difference in height between the projections and the depressions formed on the surface of the separation membrane or thickness of the channel material provided along the surface of the separation membrane is 80 μm to 1000 μm.

We also provide a method of producing a spiral separation membrane element, comprising the steps of:

(a) preparing at least two pairs of separation membranes, wherein each pair of separation membrane is prepared by arranging two separation membranes so that a surface of one separation membrane in contact with raw fluid and the surface of the other separation membrane in contact with the raw fluid oppose each other to thereby define a raw fluid channel between the two separation membranes, bonding edge portion on one side of the separation membrane with edge portion on one side of the other separation membrane by using a sealing material so that the raw fluid channel is closed by the sealing material to thereby prepare a pair of separation membranes;

(b) producing a laminate of the pairs of the separation membranes by disposing the at least two pairs of the separation membranes prepared in the step of preparing the separation membrane pairs one on another so that the surface in contact with permeate fluid of one separation membrane pair opposes with the surface in contact with the permeate fluid of the adjacent separation membrane pair to thereby define a permeate fluid channel between the opposing separation membrane pairs with the side of the permeate fluid channel open at the side as described above for the separation membrane; and (c) producing a wound body by winding the laminate of the separation membrane pairs prepared in the step of preparing the laminate around a permeate fluid collection tube having holes for collecting the permeate fluid in its peripheral surface so that the open section of the permeate fluid channel corresponds to the collection holes of the permeate fluid collection hole.

In our spiral separation membrane elements, sliding of the membranes between the opposing separation membranes is suppressed and, therefore, separation performance of the spiral separation membrane element of the invention is stably retained for a long time.

Figure 1:
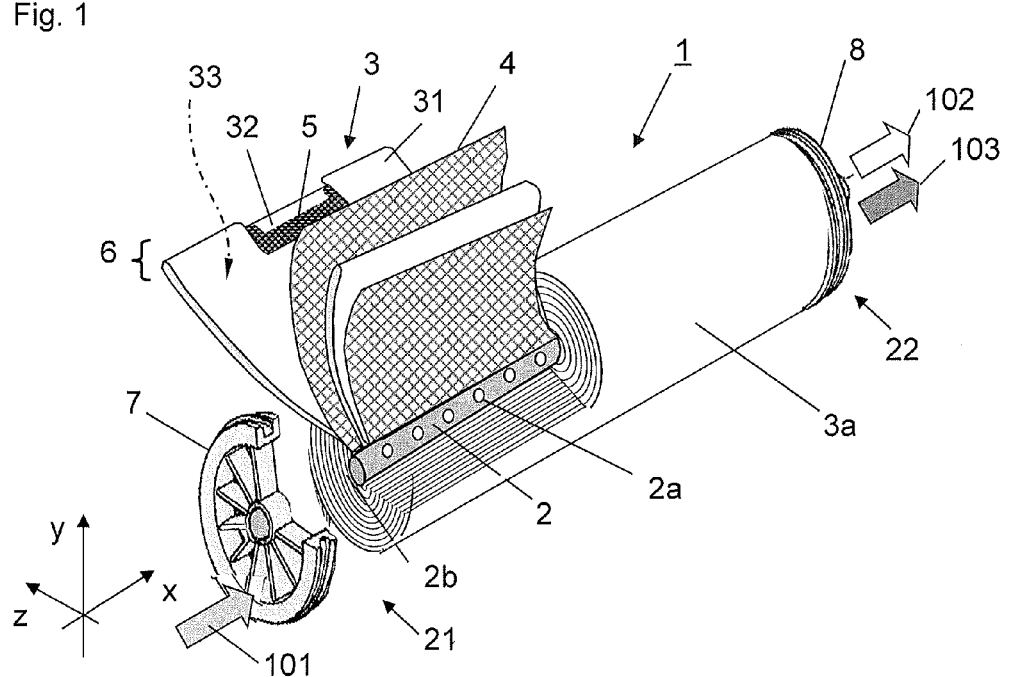
FIG. 1 is a partially cut-away perspective view of an example of a spiral separation membrane element.

REFERENCE SIGNS LIST 1 spiral separation membrane element
2 permeate fluid collection tube (permeate water collection tube)
2a permeate fluid collection hole (water collection hole)
2b end of the permeate fluid collection tube (end of the water collection tube)
21 upstream end of the wound body
22 downstream end of the wound body
3 separation membrane
3a wound body
31 surface in contact with the raw fluid (surface of the separation membrane on the feed water side)
32 surface in contact with the permeate fluid (surface of the separation membrane on the permeate water side)
4 raw fluid channel (feed water channel)
5 permeate fluid channel (permeate water channel)
6 separation film pair
7 upstream end plate
8 downstream end plate
9 sealing material
101 raw fluid
102 permeate fluid
103 concentrate fluid
H: height (thickness) of the sealing material
L: length of the separation membrane in the direction perpendicular to the axial direction of the permeate fluid collection tube (water collection tube)
T: tip of the separation membrane pair
W1 width of the sealing material used in preparing the separation membrane pair
W2 width of the separation membrane in the axial direction of the permeate fluid collection tube (water collection tube)

DETAILED DESCRIPTION

Next, an example of a spiral separation membrane element is explained by referring to FIG. 1.

In FIG. 1, a spiral separation membrane element 1 comprises:
(A-1) a wound body 3a formed with a spirally wound separation membrane 3,
(A-2) an upstream side end plate 7 fitted on one end of the wound body 3a, and a downstream side end plate 8 fitted on the other end of the wound body 3a,
(A-3) a raw fluid channel 4 provided along one surface of the separation membrane 3, and a permeate fluid channel 5 provided along another surface of the separation membrane 3, and
(A-4) a permeate fluid collection tube 2.

The wound body 3a is formed,
(A-5) with the raw fluid channel 4 closed to the permeate fluid collection tube 2, and the permeate fluid channel 5 open to the permeate fluid collection tube 2, by
(A-6) spirally winding the separation membrane 3 around the permeate fluid collection tube 2.

In addition, in the spiral separation membrane element 1,
(A-7) one axial end 2b of the permeate fluid collection tube 2 is closed, and the other open end is located in the exterior of the downstream side end plate 8,
(A-8) raw fluid 101 is supplied to the raw fluid channel 4 through the upstream side end plate 7,
(A-9) concentrate fluid 103 which did not permeate through the separation membrane 3 is discharged through the downstream side end plate 8,
(A-10) permeate fluid 102 which has permeated through the separation membrane 3 is guided and discharged through the permeate fluid collection tube 2.

Figure 3:
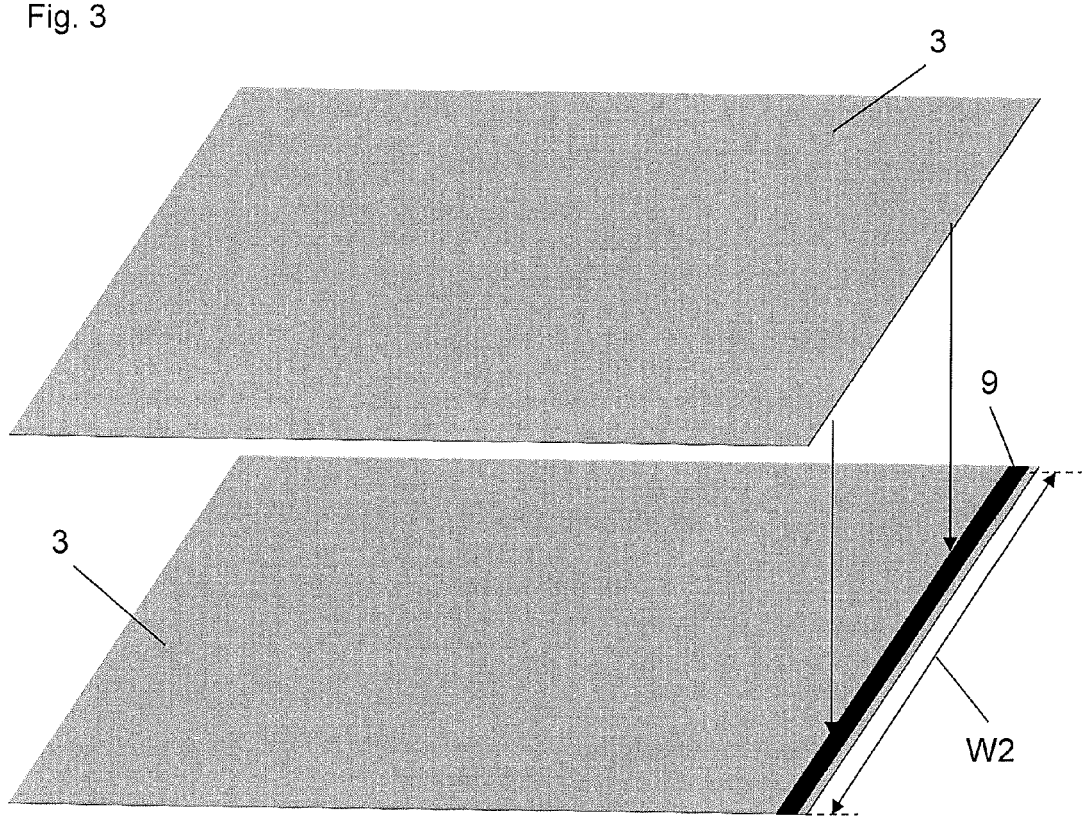
FIG. 3 is an exploded schematic perspective view explaining a production method of separation membrane pair of a spiral separation membrane element according to an example.

More specifically,
(B-1) the spiral separation membrane element 1 has at least two pairs of separation membrane pairs 6, and
in the separation membrane pair 6, the separation membranes 3 are arranged so that the surface in contact with the raw fluid 101 of one separation membrane 3 opposes the surface in contact with the raw fluid 101 of the adjacent separation membrane 3, and
the raw fluid channel 4 between the edge portions on the side of the permeate fluid collection tube 2 is closed from the permeate fluid collection tube 2 by a sealing material 9 provided on the separation membrane 3 as shown in FIG. 3,
(B-2) the adjacent separation membrane pairs 6 are arranged so that the surface in contact with the permeate fluid 102 of one separation membrane pair 6 opposes the surface in contact with the permeate fluid 102 of the adjacent separation membrane pair 6, and
the permeate fluid channel 5 between the edges on the side of the permeate fluid collection tube 2 is open to the permeate fluid collection tube 2, and
(B-3) the wound body 3a is formed by spirally winding the separation membrane pairs 6 around the permeate fluid collection tube 2.

The separation membrane 3 is not particularly limited as long as it can separate various components in the fluid supplied to the surface of the separation membrane and the permeate fluid that has permeated through the separation membrane can be obtained. A composite separation membrane comprising a layer having the separation function, a porous support membrane, and a substrate is preferably used.

The material used for the separation functional layer is preferably a crosslinkable polymer in view of the control of the pore size and durability. In further view of the separation performance of various components, use of polyamide separation functional layer prepared by polycondensation of a polyfunctional amine and a polyfunctional acid halide or an organic-inorganic hybrid functional layer on the porous support membrane is preferable. Use of a porous support membrane simultaneously having the function of a separation layer and a support layer is also possible, and exemplary such layers include cellulose membrane, polyfluorovinylidene membrane, polyether sulfone membrane, and polysulfone membrane.

It is precisely explained in the case where the separation functional layer comprises a polyamide. That is, the polyamide membrane may be formed by interfacial polycondensation of a polyfunctional amine and a polyfunctional acid halide. In this case, at least one of the polyfunctional amine and the polyfunctional acid halide preferably contains a trifunctional compound.

A polyfunctional amine is an amine containing at least 2 primary and/or secondary amino groups per molecule, wherein at least one of the amino groups is a primary amino group. Exemplary such polyfunctional amines include aromatic polyfunctional amines such as phenylenediamine, xylylenediamine, 1,3,5-triaminobenzene, 1,2,4-triaminobenzene, 3,5-diaminobenzoic acid, 3-aminobenzylamine, and 4-aminobenzylamine wherein the two amino groups are bonded to the benzene ring at any one of ortho-, metha-, and para-positions, aliphatic amines such as ethylenediamine and propylene diamine, alicyclic polyfunctional amines such as 1,2-diaminocyclohexane, 1,4-diaminocyclohexane, 4-aminopiperidine, and 4-aminoethylpiperazine.

Among these, the preferred is an aromatic polyfunctional amine having at least 2 and up to 4 primary and/or secondary amino groups per molecule in consideration of the selective separation and permeation abilities as well as heat resistance of the resulting membrane. Examples of preferable polyfunctional aromatic amines include m-phenylenediamine, p-phenylenediamine, and 1,3,5-triaminobenzene, and the more preferred is use of m-phenylenediamine (hereinafter referred to as m-PDA) in view of availability and handling convenience.

These polyfunctional amines may be used either alone or in combination of 2 or more amines. When 2 or more polyfunctional amines are used in combination, the combination may comprise the amines as described above or the combination may comprise an amine as described above used with an amine having at least 2 secondary amino groups per molecule. Exemplary amines having at least 2 secondary amino groups per molecule include piperazine, and 1,3-bispiperidylpropane.

A polyfunctional acid halide is an acid halide having at least 2 halogenated carbonyl groups per molecule. Examples of trifunctional acid halide include trimesic acid chloride, 1,3,5-cyclohexane tricarboxylic acid trichloride, and 1,2,4-cyclobutane tricarboxylic acid chloride. Examples of difunctional acid halide include aromatic difunctional acid halides such as biphenyl dicarboxylic acid dichloride, azobenzene dicarboxylic acid dichloride, terephthalic acid chloride, isophthalic acid chloride, and naphthalene dicarboxylic acid chloride; aliphatic difunctional acid halides such as adipoyl chloride and sebacoyl chloride; and alicyclic difunctional acid halide such as cyclopentane dicarboxylic acid dichloride, cyclohexane dicarboxylic acid dichloride, and tetrahydrofuran dicarboxylic acid dichloride.

In consideration of the reactivity with the polyfunctional amine, the polyfunctional acid halide is preferably a polyfunctional acid chloride, and the polyfunctional acid halide is preferably a polyfunctional aromatic acid chloride having at least 2 and up to 4 carbonyl chloride groups per molecule in consideration of the selective separation and heat resistance of the membrane. Among these, the preferred is use of trimesic acid chloride in view of availability and handling convenience. These polyfunctional acid halides may be used either alone or in combination of 2 or more amines.

Use of a separation membrane wherein the separation functional layer has an organic-inorganic hybrid structure containing Si element is also possible in view of moldability and chemical resistance. The organic-inorganic hybrid membrane is not particularly limited, and exemplary membranes include those obtained by using a silicon compound (A) having a reactive group containing an ethylenic unsaturated group and a hydrolyzable group directly bonded to the silicon atom and a compound (B) having an ethylenic unsaturated group other than the silicon compound as described above, wherein the hydrolyzable group of the silicon compound (A) has been condensed, and a polymerization product of the silicon compound (A) and the compound (B) containing an ethylenic unsaturated group.

The silicon compound (A) having a reactive group containing an ethylenic unsaturated group and a hydrolyzable group directly bonded to the silicon atom is described.

The reactive group having an ethylenic unsaturated group is directly bonded to the silicon atom. Exemplary such reactive groups include vinyl group, allyl group, methacryloxyethyl group, methacryloxypropyl group, acryloxyethyl group, acryloxypropyl group, and styryl group. In view of polymerizability, the preferred are propyl group, acryloxypropyl group, and styryl group.

The silicon compound undergoes condensation through mutual bonding by siloxane bond, through the process such as conversion of the hydrolyzable group directly bonded to the silicon atom into hydroxy group. Exemplary hydrolyzable groups include functional groups such as alkoxy group, alkenyloxy group, carboxy group, ketoxime group, aminohydroxy group, halogen atom, and isocyanate group.

The alkoxy group is preferably the one containing at least 1 and up to 10 carbon atoms, and more preferably the one containing 1 or 2 carbon atoms. The alkenyloxy group is preferably the one containing at least 2 and up to 10, more preferably the one containing at least 2 and up to 4 carbon atoms, and more preferably the one containing 3 carbon atoms. The carboxy group is preferably the one containing at least 2 and up to 10, and more preferably the one containing 2 carbon atoms, namely, acetoxy group. Examples of the ketoxime group include methylethylketoxime group, dimethylketoxime group, or diethylketoxime group. The aminohydroxy group is the one wherein the amino group is bonded to the silicon atom via oxygen, and exemplary such aminohydroxy groups include dimethylaminohydroxy group, diethylaminohydroxy group, and methylethylaminohydroxy group. The halogen atom used is preferably chlorine atom.

In the formation of the separation functional layer, also usable is the silicon compound wherein the hydrolyzable group has partly undergone hydrolysis to take silanol structure, and the silicon compound wherein a part of the hydrolyzable group in the 2 or more silicon compounds has polymerized to the extent not undergoing the hydrolysis and condensation.

The silicon compound (A) is preferably the one represented by the following general formula (a).

$$\mathrm{Si}(R^1)_m(R^2)_n(R^3)_{4-m-n} \quad (a)$$

wherein R¹ represents a reactive group containing an ethylenic unsaturated group, R² represents an alkoxy group, alkenyloxy group, carboxy group, ketoxime group, halogen atom, or isocyanate group, R³ is H or an alkyl group, m and n are respectively an integer satisfying m+n≤4, m≥1, and n≥1. When 2 or more functional groups are bonded to the silicon atom in each of the R¹, R², and R³, they may be the same or different.

R¹ is a reactive group containing an ethylenic unsaturated group as described above.

R² is a hydrolyzable group as described above. When R³ is an alkyl group, the alkyl group may preferably contain at least 1 and up to 10 carbon atoms, and more preferably, 1 or 2 carbon atoms.

The hydrolyzable group is preferably an alkoxy group in view of the viscosity of the reaction mixture in the formation of the separation functional layer.

Exemplary such silicon compounds include vinyltrimethoxysilane, vinyltriethoxysilane, styryltrimethoxysilane, methacryloxypropylmethyldimethoxysilane, methacryloxypropyltrimethoxysilane, methacryloxypropylmethyldiethoxysilane, methacryloxy propyltriethoxysilane, and acryloxy propyltrimethoxysilane.

In addition to the silicon compound (A), a silicon compound not having a reactive group containing an ethylenic unsaturated group but having a hydrolyzable group may also be used in combination. Examples of such silicon compound include those represented by the formula (a) but wherein m is zero although m is defined as "m≥1" in the formula (a) as described above. Exemplary such silicon compounds include tetramethoxysilane, tetraethoxysilane, methyltrimethoxysilane, and methyltriethoxysilane.

Next, a compound (B) having an ethylenic unsaturated group other than the silicon compound (A) is described.

Ethylenic unsaturated group is polymerizable by addition. Exemplary such compounds include ethylene, propylene, methacrylic acid, acrylic acid, styrene, and their derivatives.

In addition, the compound (B) is preferably an alkaline soluble compound having an acid group so that the resulting membrane exhibits high selective permeation and high salt blockage rate when the separation membrane is used for the separation of, for example, an aqueous solution.

Exemplary preferable acid structures include carboxylic acid, phosphonic acid, phosphoric acid, and sulfonic acid, and the acid structure may be in the form of an acid, an ester compound, or a metal salt. The compound having 1 or more ethylenic unsaturated group may have 2 or more acids, and the preferred is a compound having 1 or 2 acid group.

Of the compound having 1 or more ethylenic unsaturated group, exemplary compounds having carboxylic acid group include maleic acid, maleic anhydride, acrylic acid, methacrylic acid, 2-(hydroxymethyl)acrylic acid, 4-(meth)acryloyloxyethyltrimellitic acid and the corresponding anhydrides, 10-methacryloyloxydecyl malonic acid, N-(2-hydroxy-3-methacryloyloxypropyl)-N-phenyl glycine, and 4-vinyl benzoic acid.

Of the compound having 1 or more ethylenic unsaturated group, exemplary compounds having phosphonic acid group include vinylphosphonic acid, 4-vinylphenylphosphonic acid, 4-vinylbenzylphosphonic acid, 2-methacryloyloxyethyl phosphonic acid, 2-methacrylamideethylphosphonic acid, 4-methacrylamide-4-methyl-phenyl-phosphonic acid, 2-[4-(dihydroxyphoshpryl)-2-oxa-butyl]-acrylic acid, and 2,4,6-trimethyl-phenyl 2-[2-dihydroxyphoshpryl)-ethoxymethyl]acrylate.

Of the compound having 1 or more ethylenic unsaturated group, exemplary phosphate ester compounds include 2-methacryloyloxypropyl monohydrogenphosphate, 2-methacryloyloxypropyl dihydrogenphosphate, 2-methacryloyloxyethyl monohydrogenphosphate, 2-methacryloyloxyethyl dihydrogenphosphate, 2-methacryloyloxyethyl-phenyl hydrogenphosphate, dipentaerythritol-pentamethacryloyl oxyphosphate, 10-methacryloyloxydecyl dihydrogenphosphate, dipentaerythritol pentamethacryloyl oxyphosphate, phosphoric acid mono-(1 -acryloyl-piperidin-4-yl)-ester, 6-(methacrylamide)hexyl dihydrogenphosphate, and 1,3-bis-(N-acryloyl-N-propyl-amino)-propan-2-yl dihydrogenphosphate.

Of the compound having 1 or more ethylenic unsaturated group, exemplary compounds having sulfonic acid group include vinylsulfonic acid, 4-vinylphenylsulfonic acid, and 3-(methacrylamide)propylsulfonic acid.

A reaction mixture containing the compound having 1 or more ethylenic unsaturated group and a polymerization initiator in addition to the silicon compound (a) is used to form the separation functional layer of the separation membrane used in the spiral separation membrane element of the invention. After the coating of this reaction mixture on the porous membrane, the molecular weight of coated reaction mixture should be increased by the condensation of the hydrolyzable group, and also, by the polymerization of the ethylenic unsaturated group. When the silicon compound (A) is solely condensed, linking of the crosslinking chain will be concentrated around the silicon atom, and difference in the density between the area near the silicon atom and the area remote from the silicon atom will be significant, and the pore size in the separation functional layer tends to be inconsistent.

On the other hand, polymerization and crosslinking of the silicon compound (A) itself combined with the copolymerization of the compound (B) having the ethylenic unsaturated group results in the adequate distribution of the crosslinking points by the condensation of the hydrolyzable group and the crosslinking points by the polymerization of the ethylenic unsaturated group. Such adequate distribution of the crosslinking point contributes for the formation of a separation functional layer having consistent pore size, and a separation membrane having a well balanced permeation performance and removal performance is thereby realized. In this process, the compound having 1 or more ethylenic unsaturated group should have a high molecular weight since the compound having 1 or more ethylenic unsaturated group of low molecular weight may bleed out of the membrane during the use of the separation membrane, inviting loss of the membrane performance.

In the production method of the separation functional layer, the content of the silicon compound (A) having a reactive group containing an ethylenic unsaturated group and a hydrolyzable group directly bonded to the silicon atom is preferably at least 10 parts by weight, and more preferably at least 20 parts by weight and up to 50 parts by weight in relation to 100 parts by weight of the solid content in the reaction mixture. The solid content in the reaction mixture is all components in the reaction mixture excluding the solvent, the water generated by the condensation, the components such as alcohol that will be distilled off, namely, the components that will be finally included in the separation membrane as the separation functional layer. When the content of the silicon compound (A) is insufficient, crosslinking is likely to be insufficient, and this may result in the problem of dissolution of the separation functional layer during the filtration using the membrane inviting loss of separation performance.

The content of the compound (B) containing the ethylenic unsaturated group is preferably up to 90 parts by weight, and more preferably at least 50 parts by weight and up to 80 parts by weight in relation to 100 parts by weight of the solid content in the reaction mixture. When the content of the compound (B) is within such range, the resulting separation functional layer will be sufficiently crosslinked, and stable filtration through he membrane will be possible without dissolution of the separation functional layer.

Next, the method of forming the separation functional layer on the porous support membrane is described.

An exemplary method of forming the separation functional layer comprises the step of coating the reaction mixture of the silicon compound (A) and the compound (B) containing the ethylenic unsaturated group, the step of removing the solvent, the step of polymerizing the ethylenic unsaturated group, and step of condensing the hydrolyzable group, conducted in this order. The condensation of the hydrolyzable group may take place simultaneously with the step of polymerizing the ethylene unsaturated group.

First, the reaction mixture containing (A) and (B) is brought in contact with the porous support membrane. The reaction mixture is typically a solution containing a solvent, and the solvent is not particularly limited as long as it does not destroy the porous support membrane and it can dissolve (A) and (B), and also, the optionally added polymerization initiator. Preferably, water at an amount of 1 to 10 times, and preferably at least 1 to up to 5 times the molar amount of the silicon compound (A) is added together with an inorganic acid or an organic acid to promote hydrolysis of the silicon compound (A).

Exemplary preferable solvents for the reaction mixture include water, alcoholic organic solvents, ethereal organic solvents, ketone organic solvents, and mixtures thereof.

Exemplary alcoholic organic solvents include methanol, ethoxymethanol, ethanol, propanol, butanol, amyl alcohol, cyclohexanol, methylcyclohexanol, ethylene glycol monomethyl ether (2-methoxyethanol), ethyleneglycol monoacetate ester, diethylene glycol monomethyl ether, diethylene glycol monoacetate, propylene glycol monoethyl ether, propylene glycol monoacetate, dipropylene glycol monoethyl ether, and methoxybutanol.

Exemplary ethereal organic solvents include methylal, diethylether, dipropyl ether, dibutyl ether, diamyl ether, diethyl acetal, dihexyl ether, trioxane, and dioxane.

Exemplary ketone organic solvents include acetone, methyl ethyl ketone, methyl propyl ketone, methyl isobutyl ketone, methyl amyl ketone, methyl cyclohexyl ketone, diethyl ketone, ethyl butyl ketone, trimethyl nonanone, acetonitrile acetone, dimethyl oxide, phorone, cyclohexanone, and diacetone alcohol.

The amount of solvent added is preferably at least 50 parts by weight and up to 99 parts by weight, and more preferably at least 80 parts by weight and up to 99 parts by weight. Excessive use of the solvent may result in the increased risk of defects formed in the membrane while insufficient use may result in the insufficient water permeability of the resulting separation membrane.

Preferably, the porous support membrane is brought in contact with the reaction mixture evenly and continuously on the surface of the porous support membrane, for example, by coating the porous support membrane with the reaction mixture using a coating device such as spin coater, wire bar, flow coater, die coater, roll coater, or spray. Alternatively, the porous support membrane may be dipped in the reaction mixture.

When the porous support membrane is dipped in the reaction mixture, the porous support membrane is preferably contacted with the reaction mixture for at least 0.5 minutes and up to 10 minutes, and more preferably, for at least 1 minute and up to 3 minutes, After the contact of the reaction mixture with the porous support membrane, excessive reaction mixture is preferably removed from the membrane so that no drops of reaction mixture remain on the membrane. Sufficient removal of the reaction mixture prevents formation of membrane defects by the remaining drops of the reaction mixture and loss of the membrane performance. The removal of the excessive reaction mixture may be accomplished, for example, by vertically holding the porous support membrane to facilitate natural draining of the reaction mixture by gravity, or compulsorily blowing the drops off the membrane by blowing nitrogen or other gas stream. If desired, the membrane surface may be dried after the removal of the excessive reaction mixture to partly remove the solvent of the reaction mixture.

The step of condensing the hydrolyzable group of the silicon is conducted by bringing the reaction mixture in contact with the porous support membrane followed by heating. The temperature used in this heating should be below the temperature at which the porous support membrane melts to lose its performance as the separation membrane. To smoothly promote the condensation reaction, the reaction is typically preferable to conduct the reaction at least 0° C., and more preferably at least 20° C. The reaction temperature is preferably up to 150° C., and more preferably up to 100° C. When the reaction temperature is at least 0° C., the hydrolysis and the condensation is smoothly promoted, and when the temperature is up to 150° C., the hydrolysis and the condensation can be readily controlled.

If desired, a catalyst promoting the hydrolysis or the condensation may be added to promote the reaction at a lower temperature. Heating conditions and humidity conditions may also be adequately selected to promote adequate condensation so that the resulting separation functional layer has fine pores.

Exemplary methods used for polymerizing the silicon compound (A) and the compound (B) having the ethylenic unsaturated group include heat treatment and irradiation with an electromagnetic wave, electron beam, or plasma. Exemplary electromagnetic waves are X ray and γ ray. Any desired method may be used for the polymerization, and the preferred is the polymerization by irradiation of an electromagnetic wave in view of the running cost, productivity, and the like. Among the electromagnetic waves, the preferred is use of infrared radiation or ultraviolet radiation in view of the convenience. When the polymerization is actually conducted by using the infrared radiation or the ultraviolet radiation, the light source does not have to selectively emit the light of such wavelength, and the light is not particularly limited as long as the electromagnetic wave of such range is included. However, the intensity of the electromagnetic wave having such wavelength range is preferably stronger than the intensity of the electromagnetic waves of other wavelengths in view of reducing the time required for the polymerization and ease of control of the polymerization conditions.

The electromagnetic wave may be emitted from halogen lamp, xenon lamp, UV lamp, eximer lamp, metal halide lamp, rare gas fluorescence lamp, mercury lamp, or the like. The energy of the electromagnetic wave is not particularly limited as long as it can accomplish the polymerization. Of these, ultraviolet radiation with high efficiency and low wavelength is highly adapted for the formation of a thin membrane. Such ultraviolet radiation can be emitted from low pressure mercury lamp or eximer laser lamp. Thickness and form of the resulting separation functional layer may vary by the polymerization conditions used, and in the case of the polymerization using the electromagnetic wave, the thickness and form may greatly vary by the wavelength, intensity, distance to the irradiated object, treatment time of the electromagnetic wave. Accordingly, these conditions may be adequately optimized in each case.

In the formation of the separation functional layer, a polymerization initiator, a polymerization promoter, or the like is preferably added for the purpose of increasing the polymerization speed. The polymerization initiator and the polymerization promoter used herein is not particularly limited, and an adequate polymerization initiator or the polymerization promoter may be selected depending, for example, on the structure of the compound and the polymerization method used.

Exemplary polymerization initiators are as described below. Exemplary polymerization initiators for the polymerization by an electromagnetic wave include benzoin ether, dialkyl benzyl ketal, dialkoxy acetophenone, acylphosphine oxide or bisacylphosphine oxide, α-diketone (for example, 9,10-phenanthrenequinone), diacetyiquinone, furilquinone, anisylquinone, 4,4'-dichlorobenzylquinone, and 4,4'-dialkoxybenzylquinone, and camphorquinone.

Exemplary polymerization initiators for the polymerization by heat include azo compounds (for example, 2,2'-azobis(isobutyronitrile) (AIBN) and azobis-(4-cyanovaleric acid)), peroxides (for example, dibenzoyl peroxide, dilauroyl peroxide, tert-butyl peroctanoate, tert-butyl perbenzoic acid, and di-(tert-butyl)peroxide), and also, aromatic diazonium salt, bis sulfonium salt, aromatic iodonium salt, aromatic sulfonium salt, persulfuric acid potassium, ammonium persulfate, alkyl lithium, cumyl potassium, sodium naphthalene, and distyryl dianion. Exemplary preferable intiators for radical polymerization include benzopinacol and 2,2'-dialkylbenzopinacol.

The peroxide and the α-diketone is preferably used in combination with an aromatic amine to promote the reaction initiation. This combination is also referred to as a redox system, and examples of such system include benzoyl peroxide or camphorquinone with an amine (for example, N,N-dimethyl-p-toluidine, N,N-dihydroxyethyl-p-toluidine, and ethyl p-dimethylaminobenzoate or its derivative). Also preferred is the system containing a peroxide with ascorbic acid, barbiturates, or sulfin acid as a reducing agent.

In the subsequent heat treatment at about 100° C. to about 200° C., the polycondensation takes place, and a separation membrane having a separation functional layer from the silane coupling agent formed on the porous support membrane is obtained. The temperature used for the heating depends on the material of the porous support membrane, and when the temperature is too high, the fine pores of the porous support membrane will be blocked by melting and this may result in the reduced amount of the water produced by the compound semipermeable membrane. On the other hand, when the temperature is too low, the polycondensation reaction will be insufficient, and this will lead to the bleeding of the functional layer, and hence, decrease in the recovery rate.

In the production method as described above, the step of increasing the molecular weight of the silane coupling agent and the compound having 1 or more ethylenic unsaturated group may be conducted before, after, or simultaneously with the polycondensation step of the silane coupling agent.

The resulting separation membrane can be used as it is. However, the separation membrane is preferably used after hydrophilizing the surface of the membrane with an alcohol-containing aqueous solution, an alkaline aqueous solution, or the like.

The separation functional layer is not limited for its thickness. The thickness, however, is preferably at least 5 nm and up to 3000 nm in view of the separation performance and the permeation performance. In the case of the reverse osmosis membrane, the forward osmosis membrane, and the nano filtration membrane, the thickness is preferably at least 5 nm and up to 300 nm.

Thickness of the separation functional layer may be measured by a conventional method that has been used in measuring the thickness of the separation membrane. For example, the thickness may be measured by embedding the separation membrane in a resin, slicing an ultrathin section from the embedded membrane, and examining the section with a transmission electron microscope after the staining or other necessary treatment. The measurement in the exemplary case when the separation functional layer has a pleated structure may be conducted, by measuring the thickness in the longitudinal cross-sectional direction of the pleats for 20 pleats present above the porous support membrane at an interval of 50 nm, and calculating the average from the 20 measurements.

When the porous support membrane is used, it may be used as a membrane retaining its performance as a separation membrane but also has the function of supporting the separation functional layer.

The porous support membrane is not particularly limited for the material used and the shape. An exemplary porous support membrane, however, may comprise a substrate and a porous support layer formed on the substrate. The porous support layer may comprise polysulfone, cellulose acetate, polyvinyl chloride, epoxy resin, or a mixture or a laminate thereof, and use of polysulfone is preferable in consideration of the high chemical, mechanical, and thermal stability and ease of controlling the pore size.

For example, a solution of the polysulfone in N,N-dimethylformamide (hereinafter referred to as DMF) may be cast to a predetermined thickness on the substrate as described below, for example, a densely woven polyester or polyester nonwoven fabric, and then coagulated in water by wet coagulation.

The porous support membrane may be produced according to the method described in "Office of Saline Water, Research and Development Progress Report", No. 359 (1968) to obtain the morphology as described above by the adjustment of the polymer concentration, solvent temperature, and the poor solvent.

For example, a predetermined amount of polysulfone is dissolved in DMF to prepare a polysulfone resin solution having of predetermined concentration. This polysulfone resin solution is then coated on the substrate comprising the polyester fabric or nonwoven fabric at a substantially constant thickness, and after leaving the coated substrate for a predetermined period in the atmosphere to remove the solvent near the surface, the polysulfone is coagulated in the coagulation solution. During this process, the surface region in contact with the coagulation solution experiences rapid coagulation of the polysulfone simultaneously with the rapid volatilization of the solvent DMF, and mutually communicating fine pores are formed around the core space where DMF had been present.

In the meantime, both volatilization of the DMF and coagulation of the polysulfone proceed more slowly in the interior between the surface region and the side of the substrate compared to the surface region, and therefore, mutually communicating pores of larger size are likely to be formed as a result of the aggregation of the DMF, namely, the formation of larger cores. Since the conditions of such core formation gradually changes with the distance from the membrane surface, a support membrane with gradually changing pore size with no clear border is formed.

A polysulfone membrane having a controlled average porosity and average pore size can be obtained by adjusting the temperature and the polysulfone concentration of the polysulfone resin solution, relative humidity of the atmosphere used in the coating, time interval between the coating and the immersion in the coagulation solution, temperature and composition of the coagulation solution, and the like used in the step of membrane formation.

The porous support membrane is not particularly limited for its pore size and pore distribution as long as the separation membrane has sufficient mechanical strength and it does not have the separation performance for the component with small molecular size such as ions as in the case of the separation membrane. For example, the preferable porous support membrane has either uniform fine pores or fine pores with the pore size gradually increasing from the surface on which the separation functional layer is formed to the other surface, and the preferable porous support membrane also has a projected area diameter of the fine pores measured from the surface by using an atomic force microscope, an electron microscope, or the like of at least 1 nm and up to 100 nm. Particularly preferred is the use of the one having a projected area diameter of 3 nm to 50 nm in view of the reactivity in the interfacial polymerization and retention of the separation functional membrane.

The porous support membrane is not particularly limited for its thickness. The thickness of the porous support membrane is preferably in the range of at least 20 µm and up to 500 µm, and more preferably at least 30 µm and up to 300 µm in view of the strength of the separation membrane, provision of the height difference with the separation membrane, and morphological stability of the channel on the side of the feed water.

The morphology of the porous support membrane can be observed by using a scanning electron microscope, a transmission electron microscope, or an atomic force microscope. For example, when the porous support membrane is observed by using scanning electron microscope, the observation may be conducted by peeling the porous support layer off the substrate, and preparing the sample to examine the cross-section by cutting the porous support layer by freeze fracturing, thinly coating this sample with platinum or platinum-palladium or ruthenium tetrachroride, and preferably ruthenium tetrachroride, and observing the sample by using a high resolution field emission scanning electron microscope (UHR-FE-SEM) at an acceleration voltage of 3 kV to 6 kV. An exemplary high resolution field emission scanning electron microscopes is Model S-900 electron microscope manufactured by HITACHI.

The membrane thickness of the porous support membrane and the projected area diameter on the surface are determined by using the resulting electron micrograph. The thickness of the porous support membrane and the pore size are average values. The thickness of the porous support membrane is the average of 20 points obtained by observing the cross-section, wherein the points are at an interval of 20 µm in the direction perpendicular to the thickness direction of the membrane. The pore size is the value obtained by measuring 200 holes, and more specifically, the average of the projected area diameter of each hole.

A substrate may be used to improve the strength of the separation membrane, size stability, and provision of projections and depressions. The substrate is not particularly limited, and use of a fibrous substrate is preferable in view of retaining the separation and permeation performance, providing appropriate mechanical strength, and controlling height difference of the surface of the separation membrane.

Examples of the material which may be used for the fibrous substrate include polyolefins, polyesters, and cellulose. Use of a polyolefin or a polyester is preferable in view of providing the height difference with the surface of the separation membranes and retaining the morphology of the separation membranes. The substrate may also comprise a mixture of two or more materials.

The permeate fluid collection tube 2 is an elongated cylindrical member extending in one direction (in the direction of x axis shown in FIG. 1). The permeate fluid collection tube 2 has a plurality of fluid collection holes 2a formed through its side surface. The permeate fluid flowing along the permeate fluid channel 5 is collected into the interior of the permeate fluid collection tube 2 through these plurality of fluid collection holes 2a.

The separation membrane 3 is not particularly limited as long as it is a membrane having separation performance. Examples of the membrane which can be used for the separation membrane 3 are described later. The separation membrane 3 has a surface 31 in contact with the raw fluid 101 and a surface 32 in contact with the permeate fluid 102.

The raw fluid channel 4 is provided on the surface 31 of the separation membrane 3 in contact with the raw fluid. The surface 31 of the separation membrane 3 in contact with the raw fluid has the region where density of the resin constituting the separation membrane 3 is relatively high and the region where density of the resin constituting the separation membrane 3 is relatively lower the former region located near the surface.

The permeate fluid channel 5 can be formed by using a channel material which has been universally used in the art. Exemplary such channel materials include knitted fabric such as tricot. The permeate fluid channel 5 is provided on the surface of the separation membrane 3 of the separation membrane pair 6 in contact with the permeate fluid. The member forming the permeate fluid channel 5 may be changed with another member capable of defining the permeate fluid channel. When the separation membrane 3 used is the one provided with projections and depressions on its surface, the permeate fluid channel 5 can be formed by the projections and depressions. In this case, use of the channel material as described above can be omitted. The details of forming the permeate fluid channel will be described later.

The adjacent separation membrane pairs 6 are disposed one on another to form layers of the separation membrane pairs so that the surface 32 in contact with the permeate fluid of one separation membrane opposes the surface 32 in contact with the permeate fluid of the adjacent separation membrane pair. The planar shape of the separation membrane pair 6 is rectangle. The space between the adjacent separation membrane pairs 6 is closed by three sides and the remaining one side (located along the permeate fluid collection tube 2) is open.

Each separation membrane pair 6 is placed so that the opening of the open side opposes the permeate fluid collection tube 2, before being wound around the permeate fluid collection tube 2. In the separation membrane element 1, a plurality of separation membrane pairs 6 disposed one on another are wound around the permeate fluid collection tube 2 to form the wound body 3a. The interior surfaces of each separation membrane pair 6 are the surfaces 31 in contact with the raw fluid, and the adjacent separation membranes 3 of the separation membrane pair 6 constitutes the separation membrane pair 6 with the surfaces 31 in contact with the raw fluid opposing with each other. In other words, in each separation membrane pair 6, the raw fluid channel 4 is formed between the adjacent separation membrane 3, and the permeate fluid channel 5 is formed in the exterior of the separation membrane pair 6.

The upstream side end plate 7 is secured to the upstream end 21 of the wound body 3a formed by the separation membrane pair 6, and the downstream side end plate 8 is secured to the downstream end 22 of the wound body 3a formed by the separation membrane pair 6.

The spiral separation membrane element 1 may also be provided with members other than those described above. For example, the wound body 3a of the separation membrane may be surrounded by a film or other members.

The raw fluid 101 is supplied onto the surfaces 31 in contact with the raw fluid of the separation membrane 3 through the upstream side end plate 7. The permeate fluid 102 that has permeated through the separation membrane 3 passes through the permeate fluid channel 5 defined between the separation membrane pairs 6, and flows into the interior of the permeate fluid collection tube 2 through the fluid collection holes 2a of the permeate fluid collection tube 2. The permeate fluid 102 flowing in the permeate fluid collection tube 2 is guided to the exterior of the downstream side end plate 8, namely, to the exterior of the separation membrane element 1. The concentrate fluid 103 passes through the raw fluid channel 5 between the surfaces 31 in contact with the raw fluid to be discharged from the downstream side end plate 8 to the exterior of the separation membrane element 1. The raw fluid 101 thereby separated into the permeate fluid 102 and the concentrate fluid 103.

Each of the plural separation membrane pairs 6 in the spiral separation membrane element 1 is disposed so that the surface 31 of the separation membranes 3 in contact with the raw fluid opposes the surface 31 in contact with the raw fluid of the other separation membrane 3, and the edge portions of the surface 31 in contact with the raw fluid of one separation membrane which is parallel to the axial direction of the permeate fluid collection tube 2 and which is nearer to the permeate fluid collection tube 2 is sealed with the corresponding edge portions of the opposing separation membrane by the sealing material 9 as shown in FIG. 3. As described above, the two separation membranes 3 are disposed one on another so that the surface 31 in contact with the raw fluid of one separation membrane 3 opposes the surface 31 in contact with the raw fluid of another separation membrane 3 and, in addition, the edge portion of the separation membrane which is parallel to the axial direction of the permeate fluid collection tube 2 and nearer to the permeate fluid collection tube 2 is sealed with the corresponding edge portion of the opposing separation membrane on the surface 31 in contact with the raw fluid. Since the separation membrane pair 6 is formed by such sealing with the sealing material 9, folding of the long separation membrane separation membrane that had previously been necessary is no longer necessary.

In the folded type conventional separation membrane, the membrane is somewhat distorted near the crease (fold) of the separation membrane. In contrast, the edge portions of the plurality of the separation membrane pairs 6 in the spiral separation membrane element 1 are sealed by the sealing material 9, and the separation membrane pairs 6 are free from the problem of the distortion of the separation membrane near the crease (fold). When the production process includes a folding step, the folding of the separation membrane 3 may be insufficient, and in such case, the separation membrane 3 is distorted near the crease, and some spaces of gaps may be left near the crease after the production of the spiral separation membrane element by the winding of the separation membrane pairs 6, and presence of such spaces may invite fluid leakage. Such fluid leakage is associated with the problem of decrease in the recovery rate of the separation membrane pairs.

The "recovery rate" of the separation membrane pair is the percentage of the separation membrane pairs that exhibited air leakage in an air leakage test of the spiral separation membrane element in water. In the air leakage test, the number of the separation membrane pairs with the air leakage was counted, and the recovery rate was calculated by the following formula:

{(the number of the separation membrane pairs which exhibited the air leakage)/(the number of the separation membrane pairs being tested)}× 100

The air leakage test may be conducted by blocking the permeate water collection tube of the spiral separation membrane element on one side, and introducing air from the other end. The introduced air passes through the holes of the permeate water collection tube and reaches the permeate water side of the separation membrane pair. When spaces are present near the crease of the separation membrane due to the insufficient folding of the separation membrane and the distortion of the separation membrane near the crease as described above, the air flows into such spaces. As a consequence, the air moves to the raw fluid side of the separation membrane pair, and the air is discharged into the water from the raw fluid side of the end of the separation membrane element.

More specifically, the two separation membranes 3 are disposed one on another so that the surfaces 31 in contact with the raw fluid of these separation membranes 3 form an opposing pair. If desired, a channel material may be provided between the adjacent separation membranes 3 to thereby form the raw fluid channel 4, or alternatively, separation membranes 3 preliminarily provided with a height difference by forming the projections and depressions on the surfaces 31 that will be in contact with the raw fluid may be used to define the raw fluid channel 4 by this height difference.

The method using the sealing material is free from the creases of the separation membrane, and the membrane is less likely to be distorted near the crease. Accordingly, the method using the sealing material is less likely to be associated with the problem of the space as described above.

The method used for the sealing includes adhesion using an adhesive, a pressure sensitive tape, a thermal adhesion film, or the like, sandwiching of a sheet made from a rubber, silicone, or the like, and melt adhesion using laser or ultrasound. However, in the case of the melt adhesion by heating, the functional layer and the porous support membrane of the separation membrane should be treated at least 200° C., and the site of the melt adhesion and the surrounding area is deteriorated or destroyed, leading to loss of the function as the separation membrane. The melt adhesion using laser and ultrasound may also result in the deterioration and destruction of the site of the melt adhesion and the surrounding area. However, the raw fluid does not reach the site of the melt adhesion and separation function is not necessary and, therefore, consideration of the effects of the thermal deterioration not necessary as long as the melt adhesion is not insufficient. However, as a conclusion, sealing by using a sealing material is preferable in view of completeness and convenience of the sealing.

The sealing material is a material such as a sheet or an adhesive which is capable of sealing the adjacent separation membranes 3 of the separation membrane pair 6, namely, the surfaces 31 of the separation membranes 3 in contact with the raw fluid at the edge portion parallel with the axial direction of the permeate fluid collection tube 2 and nearer to the permeate fluid collection tube 2. The term "adhesion" means adhesion of the separation membrane 3 with an adhesive such as an instant adhesive, two-part adhesive, hot melt adhesive, thermoplastic resin adhesive, thermosetting resin adhesive, emulsion adhesive, elastomer adhesive, or the like, and the term "melt adhesion" means adhesion of the separation membrane 3 by melting the separation membranes 3 and cooling the separation membranes 3 while pressing the separation membranes 3 together.

The sealing material 9 shown in FIG. 3 is not particularly limited as long as the washing of the spiral separation membrane element 1 with a chemical reagent such as acid or alkali, and commercially available sealing materials may be used. A material containing an ethylene-vinyl acetate copolymer, polyethylene, or polyamide as its main component and which can be used as a hot melt adhesive is preferable in view of high chemical resistance, and since the separation membrane pair 6 can be conveniently prepared from two separation membranes 3 in a short time.

Figure 2:
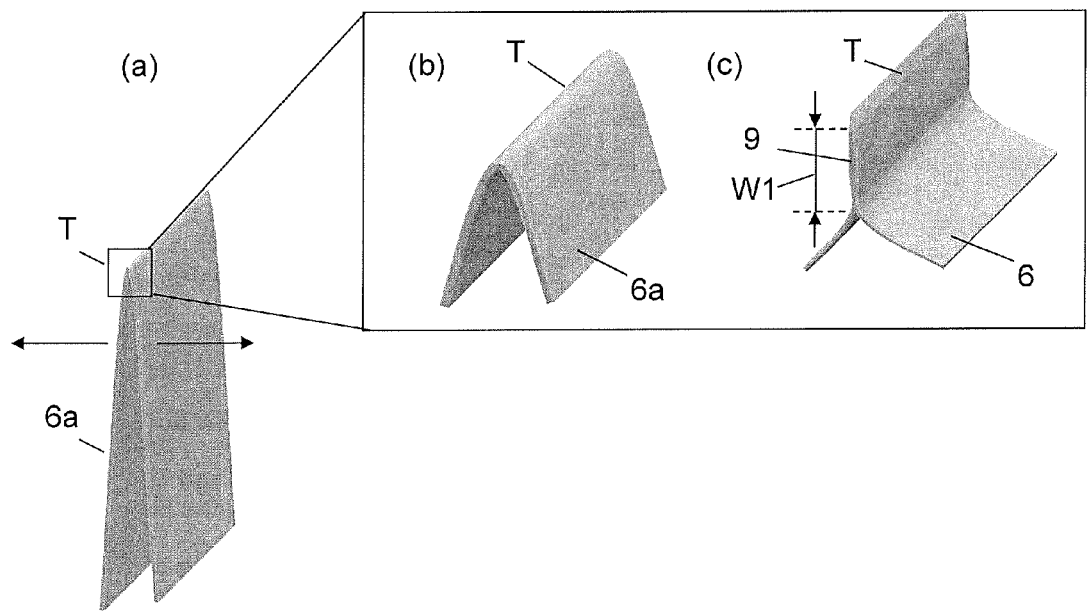
FIG. 2 is a schematic perspective view showing difference between the tip portion of the separation membrane pair used in a conventional spiral separation membrane element and the tip portion of separation membrane pair used in a spiral separation membrane element.

In FIGS. 2(a) to (c), the edge of the separation membrane pair which is the edge along the permeate fluid collection tube 2 is shown as tip T. In the case of the separation membrane pair 6a having the crease as shown in FIG. 2(a), the whole separation membrane, namely, the separation membrane to the tip T of the membrane pair 6a can be opened from the lower side (namely, from the side opposite to the tip T) until the crease is fully flat as shown in FIG. 2(b). On the other hand, as shown in FIG. 2(c), in the separation membrane pair 6 sealed with a sealing material 9 having a width W1, the separation membrane is not opened in the region where the sealing material 9 is provided, namely, in the region where distance to the tip T is up to W1.

When the width W1 of the sealing material 9 in the axial direction of the separation membrane 3 in preparing the separation membrane pair by disposing the upper and the lower separation membranes 3 shown in FIG. 3 one on another is insufficient, durability when the raw fluid is introduced after stating the pressurized filtration will be insufficient, and a part of the raw fluid may flow into the side of the permeate water. On the other hand, when the width W1 of the sealing material 9 is too wide, the area of the separation membrane 3 actually contributing for the separation (namely, the effective membrane area) will be reduced despite the improvement in the durability. Accordingly, in view of such balance, the width W1 of the sealing material 9 is at least 5 mm and up to 100 mm, and more preferably at least 10 mm and up to 100 mm.

Figure 4:
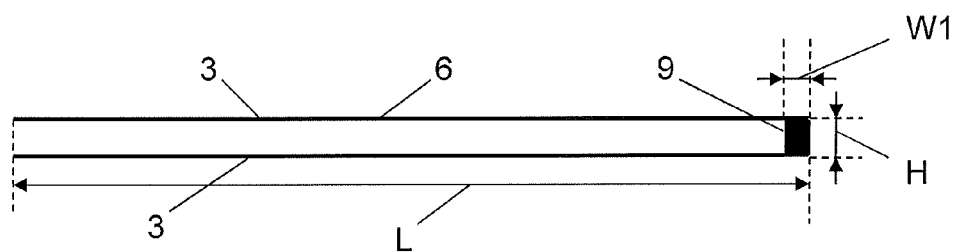
FIG. 4 is schematic longitudinal cross-sectional view of separation membrane pair formed by disposing the upper and the lower separation membranes of FIG. 3 one on another seen in the direction perpendicular to the side opposing a permeate fluid collection tube (in the lengthwise direction of the separation membrane pair).

When the height (thickness) H of the sealing material 9 formed between the upper and lower separation membranes 3 of FIG. 4 is insufficient, the site of the adhesion of the sealing material 6 will not be able to endure the expansion of the separation membrane pair 6 upon inflow of the raw fluid, and this may lead to fracture or defect of the membrane. When the height (thickness) H of the sealing material 9 is too high, the number of the separation membrane pair 6 that can be accommodated in the spiral separation membrane element 1 will be reduced. Accordingly, the height (thickness) H of the sealing material 9 is preferably at least 5 μm and up to 500 μm, and more preferably at least 10 μm and up to 200 μm.

The examples of the fluid channel formation by the channel material are not particularly limited. On the precondition that the fluid channel material should function well even in the operation of the separation membrane element at a high pressure, the fluid channel is preferably formed by using a channel material in the case of the filtration of the sea water having a high salt concentration. On the other hand, use of the separation membrane capable of forming the fluid channel by the height difference preliminarily provided on the surface of the separation membrane is preferable for the filtration of a brackish water where particularly high water production performance is required since the flow resistance is low on both the raw fluid side and the permeate fluid side of the separation membrane.

The problems associated with the leakage as described above does not substantially occur when the spiral separation membrane element 1 is prepared by forming the separation membrane layer by using a channel material such as tricot for the formation of the permeate fluid channel 5 which has grooves for guiding the permeate fluid therealong to the side near the permeate fluid collecting tube 2 and the ridges between the grooves which support the separation membrane, and spirally winding the separation membrane layer. The problems associated with the leakage also does not occur when the spiral separation membrane element 1 is prepared by forming the separation membrane by sealing the permeate fluid side of the separation membrane with an adhesive, a heat fusion, a rubber sheet, or the like except for the edge of the separation membrane on the side parallel with the axial direction of the permeate fluid collection tube 2 and nearer to the permeate fluid collection tube 2, and spirally winding the separation membrane layer.

The number of separation membrane pairs 6 laminated and accommodated in the spiral separation membrane element 1 may be adequately selected within the range such that the merits of the invention are not adversely affected. Among the separation membrane pairs 6 laminated and accommodated in the spiral separation membrane element 1, some separation membrane pairs having the conventional structure may be included to the extent that the merits of the invention are not adversely affected.

The method used to provide the height difference, for example, the projections and depressions on the surface of the separation membrane to form the fluid channel is not particularly limited. Exemplary methods include formation of projections and depressions by embossing, isostatic pressing, calendering, and the like. In the case of the embossing, isostatic pressing, and calendering, the separation membrane may be subjected to a heat treatment at a temperature of 40° C. to 150° C. after the formation of the separation membrane to thereby improve the retention of the morphology of projections and depressions.

The pressure and the temperature used in the roll embossing are adequately determined depending on the melting point of the resin used for the separation membrane 3. For example, when epoxy resin is used for the porous resin, the embossing is preferably accomplished by applying a linear load of at least 10 kg/cm and up to 60 kg/cm, and the temperature used for the treatment is preferably at least 40° C. and up to 150° C. When a heat resistant resin such as polysulfone is used for the porous resin, the embossing is preferably conducted at a linear load of at least 10 kg/cm and up to 70 kg/cm by heating the roll to a temperature of at least 70° C. and up to 160° C. In the case of roll embossing, the embossed separation membrane is preferably taken up at a speed of at least 1 m/minute and up to 20 m/minute.

In the case of embossing, the shape of the pattern provided on the roll surface is not particularly limited. To reduce flow resistance of the fluid in the fluid channel and stabilize the fluid channel during supplying of the raw fluid to the spiral separation membrane element 1 and permeation of the fluid, exemplary shapes of the projections of the projections and depressions observed from above the surface of the separation membrane include oval, circle, ellipse, trapezoid, triangle, rectangle, square, parallelogram, rhombus, and indeterminate forms, and three dimensionally, the projections may have a cross-sectional size the same, or reducing or increasing with height.

When the surface of the separation membrane 3 on the raw fluid is provided with continuous projections or discontinuous projections having a height difference of at least 80 μm and up to 1000 μm, the fluid channel is secured by the presence of such height difference on the raw fluid side surface of the separation membrane, and provision of the channel material on the raw fluid side can be omitted.

The "continuous projection" is the projection or ridge where the material constituting the projection is continuously present as in the case of a net or a film.

The "discontinuous projections" are plurality of projections wherein no projection is formed between the projections. Exemplary such discontinuous projections include dots and stripes formed by discontinuously providing the materials. The projections are preferably dots or stripes, and more preferably dots.

When dots are provided, the dots preferably having a height of at least 0.1 mm and up to 2.0 mm and the diameter of at least 0.1 mm and up to 5.0 mm are provided at an interval of at least 0.2 mm and up to 20.0 mm. The dots are preferably arranged in staggered or grid arrangement. Provision of dots having a height of at least 0.2 mm and up to 1.0 mm and a diameter of at least 0.5 mm and up to 1.0 mm at an interval of at least 1.0 mm and up to 15.0 mm arranged in staggered or grid arrangement is more preferable.

The area where the projections are provided is not particularly limited. When the separation membranes pairs are incorporated in the spiral separation membrane element 1, the projections are preferably arranged at least in the opposite edge portions in the axial direction of the permeate fluid collection tube 2. When the projections are provided in this way, sliding between the separation membranes 3 is prevented when the separation membranes 3 are formed into an envelope. In this point of view, coating width of the projections, namely, edge band width is preferably at least 10.0 mm and up to 100.0 mm, and more preferably at least 5.0 mm and up to 70.0 mm from the edge.

The term "continuous" used herein means that the channel material is substantially continuous through the length of the channel material, and that the channel material may include some discontinuous parts to the extent not adversely affecting the merits of the invention such as decrease in the amount of water produced.

The continuous projections or discontinuous projections are preferably formed from a thermoplastic resin such as polyolefin, modified polyolefin, polyester, polyamide, urethane, or epoxy resin. In view of the workability and cost, the preferred is use of a polyolefin resin such as ethylene— vinyl acetate copolymer resin or a polyolefin resin. The most preferred is use of a polyolefin resin such as ethylene—vinyl acetate copolymer resin or a polyolefin resin which can be worked at a temperature of up to 100° C.

The method used to form the continuous projections or discontinuous projections is not particularly limited as long as the method used is capable of forming the desired pattern on the edge area of separation membrane on the raw fluid side. Exemplary methods include use of a nozzle, screen printing, and gravure coating.

The resin coating step used for the formation of the continuous projections or discontinuous projections is not particularly limited. The resin coating step is preferably conducted in the step of processing the support membrane before preparing the separation membrane, in the step of processing the laminate of the support membrane and the substrate, or in the step of processing the separation membrane.

As a combination of methods of providing a height difference, the embossing may be conducted for the entire surface of the separation membrane on the raw fluid side, and different materials in the form of particles may be discontinuously provided in addition to the embossing, or only such different materials in the form of particles may be provided on the surface.

In the case of discontinuous projections, stable fluid channel can be obtained with reduced amount of the channel material while retaining fluid resistance comparable with the case of the conventional continuous projections such as a net. The term "discontinuous" used herein means that at least a discontinuous part is present in the separation membrane pair 6 constituting the element, and the material constituting the projection is not continuously present as in the case of a net or a film but present, for example, as particles or lines where the material is discontinuously arranged. In other words, "discontinuous" means that adjacent members are distanced at the extent allowing the flow of the fluid between the members.

The term "different material" means a material having different composition or size from the material used in the separation membrane 3, and such "different material" is not particularly limited as long as the material is different in any of the composition, diameter, and morphology from the material used in the separation membrane when the separation functional layer, the porous support membrane, and the substrate are formed and the height difference is provided.

The method used to discontinuously or continuously provide the different material on the separation membrane 3 on the side of the permeate fluid is not particularly limited. Discontinuous or continuous member may be provided by hot melt processing, printing, spraying, or the like in addition to the provision of a net or a tricot.

The height difference of the separation membrane 3 on the raw fluid side provided by the method as described above can be freely adjusted as long as the resulting membrane has the required separation properties and raw fluid permeation performance. For example, the height difference can be adjusted by selecting the pressure and heating conditions in the case of embossing, and by selecting the temperature used for the treatment in the case providing the discontinuous different material by hot melt processing. However, when the height difference of the separation membrane 3 on the raw fluid side is too large, the number of the membrane separation pairs that can be accommodated in the wound body 3a will be reduced despite decrease in the flow resistance of the fluid. On the other hand, insufficient height difference result in the increase of the flow resistance of the fluid in the fluid channel, and this invites loss of the separation properties and permeability of the raw fluid. This also results in the loss of water production performance of the element, thereby increasing the cost of increasing the amount of the water production.

Accordingly, in the spiral separation membrane element 1, the height difference of the separation membrane on the raw fluid side is preferably at least 80 μm and up to 1000 μm, and more preferably at least 100 μm and up to 500 μm in consideration of the balance between the various performances as described above and the operation cost.

On the other hand, amount of the permeate fluid flowing on the permeate fluid side is small compared to the raw fluid side, and the effect of the flow resistance of the fluid is also small. Accordingly, the height difference of the separation membrane on the permeate fluid side is preferably at least 50 μm and up to 500 μm, and more preferably at least 100 μm and up to 300 μm. Exemplary materials meeting such requirements include channel material such as tricot as well as discontinuous or continuous projections formed by hot melt processing, printing, or spraying. Presence of the height difference on the permeate fluid side of the separation membrane enables formation of the fluid channel and provision of the channel material on the permeate fluid side can be omitted.

The height difference on the surface of the separation membrane on the raw fluid side (front surface) and/or the surface of the separation membrane on the permeate fluid side (rear surface) may be measured by using a commercially available profilometer. For example, the height difference at the cross-section obtained by a laser microscope may be measured by a high precision profilometer system KS-1100 manufactured by KEYENCE Corporation and the height difference may be calculated by measuring the height difference for arbitrary number of points, summing the height measured, and dividing the sum by the number of points measured.

The flow resistance of the fluid varies by the width of the groove, and the width of the groove may be determined by considering the balance between the separation properties and the permeation performance of the raw fluid, operation cost, and the like. The width of the groove is preferably at least 0.2 mm and up to 10 mm, and more preferably at least 0.5 mm and up to 3 mm. Pitch of the groove may be adequately designed in the range between at least 1/10 to up to 50 times the width of the groove. The width of the groove is the width of the depression in the surface having the height difference, and the pitch of the groove is the horizontal distance between the highest point of the surface having the height difference to the highest point of the adjacent high area.

Area percentage (%) of the projection which is higher than the median line of the height difference in the upper and/or lower direction on the surface on the raw fluid side and/or the surface on the permeate fluid side of the separation membrane in relation to the observed area (two dimensional area) of the upper surface and/or lower surface of the separation membrane may be freely adjusted so that the separation properties and the permeation performance of the raw fluid meets the requirements. When this percentage is too high, flow resistance of the fluid will be too high, and the resulting element will produce excessively small amount of water. On the other hand, flow resistance of the fluid can be reduced by using an excessively low percentage. However, the excessively low percentage will invite difficulty of maintaining consistent fluid flow, and the highly inconsistent concentration results in the poor performance of the element. In view of such situation, the area percentage is preferably at least 5% and up to 95% in relation to the observed area (two dimensional area) of the upper surface of the separation membrane, and more preferably at least 35% and up to 85% in view of the flow resistance of the fluid and stability of the fluid channel. This percentage is defined as the projection area percentage.

The production method of the spiral separation membrane element 1 is not particularly limited. A typical method wherein a polyamide separation functional layer is disposed on the porous support membrane and the substrate, and a continuous channel material is provided on the raw fluid side of the resulting separation membrane and a discontinuous channel material is provided on the permeate fluid side of the resulting separation membrane to produce the element is described. It is to be noted that, as described above, various steps required for the provision of the discontinuous channel material on the permeate fluid side can be conducted before, during, or after the formation of the separation membrane.

After combining the porous support membrane and the substrate, a polyfunctional amine aqueous solution is coated on the porous support membrane, and the excessive amine aqueous solution was removed by air knife or the like. A solution containing a polyfunctional acid halide is then coated to form a polyamide separation functional layer. The organic solvent is preferably the one which is immiscible with water but which can dissolve the polyfunctional acid halide without destroying the porous support membrane. More preferably, the organic solvent is the one which is also inactive for the polyfunctional amine compound and the polyfunctional acid halide. Preferable examples include hydrocarbon compounds such as n-hexane, n-octane, and n-decane.

If desired, the separation functional layer is further subjected to a chemical treatment by chlorine, acid, alkali, nitrous acid, or the like to thereby improve separation performance and permeation performance. The separation functional layer is then washed for the removal of the monomer and the like to thereby obtain the separation membrane sheet.

Next, the height difference is provided by embossing or a continuous and/or discontinuous channel material is provided by a hot melt processing or the like on the raw fluid side of the resulting separation membrane sheet. A continuous and/or discontinuous channel material is provided on the permeate fluid side, and a 2 inch element comprising 26 separation membrane pairs having an effective area of the separation membrane pair of 37 m² is prepared by using a conventional apparatus used in the element production. Exemplary production methods of the element include the method described in JP 44-014216 B, JP 04-011928 A, and JP 11-226366 A.

The 26 separation membrane pairs 6 are placed one on another, wound around the periphery of the permeate fluid collection tube 2, and mutually adhered. The adhesive used for the adhesion of the separation membrane pairs 6 is preferably the one having a viscosity of at least 40 PS (poise) and up to 150 PS, and more preferably, the one having a viscosity of at least 50 PS and up to 120 PS. When the adhesive has an excessively high viscosity, the separation membrane pairs are likely to be wrinkled in the winding of the separation membrane pairs around the permeate fluid collection tube 2, and this invites loss of the performance of the spiral separation membrane element 1. On the other hand, when the adhesive has an insufficient viscosity, the adhesive leaks from the edges of the leaf (the adhered region) to contaminate the apparatus, and the adhesive may stick to unnecessary parts to destroy the performance of the spiral separation membrane element 1, and operational efficiency is greatly impaired by the cleaning operation of the leaked adhesive.

The adhesive is preferably a urethane adhesive, and the viscosity in the range of at least 40 PS and up to 150 PS may be realized by using the main component (isocyanate) and the curing agent (polyol) at a ratio of the isocyanate to the polyol of 1:1 to 1:5. The viscosity of the adhesive may be determined by preliminarily measuring the viscosity of the main component, the curing agent monomer, and the mixture at a predetermined blend ratio by using Type B viscometer (JIS K 6833).

The spiral separation membrane element of the invention prepared as described above may also be used in preparing a separation membrane module wherein two or more such spiral separation membrane element are connected in serial or parallel manner and accommodated in a pressure vessel.

The spiral separation membrane element (module) can be used for a fluid separation apparatus by combining with, for example, a pump for the fluid supply, or an apparatus which conducts pretreatment of the fluid. By using such fluid separation apparatus, the raw fluid, for example, a feed water can be separated into the permeate fluid (for example, a permeate water) and the concentrate fluid (for example, concentrate water) which failed to pass through the separation membrane to thereby obtain the desired permeate water, for example, drinking water.

Removal of the components to be removed by the fluid separation apparatus is promoted with the increase of the pressure at which the apparatus is operated. The energy required for the operation, however, also increases with the pressure. In further consideration of the retention of the raw fluid channel and permeate fluid channel of the membrane element, the pressure used in the permeation of the raw fluid (feed water) is preferably at least 0.2 MPa and up to 5 MPa. Temperature of the feed water is preferably at least 5° C. and up to 45° C. since excessively high temperature results in the reduced desalination rate and the lower pH is associated with the reduced flux of membrane permeation. The feed water is preferably operated at neutral pH range since use of high pH is associated with the risk of scale of magnesium or the like in the case of the feed water with high salt concentration such as sea water, and also, membrane deterioration by the operation at a high pH.

The fluid treated by the spiral separation membrane element is not particularly limited. When the element is used for water treatment, the feed water may be a liquid mixture containing 500 mg/L to 100 g/L of TDS (total dissolved solids) such as sea water, brackish water, or exhaust water. TDS generally designates total content of the dissolved solid content in terms of the unit of (weight/volume), or in weight ratio when 1 L is regarded as 1 kg. TDS is calculated, by definition, from the weight of the residue when the solution filtered through a 0.45 μm filter is evaporated at a temperature of 39.5° C. to 40.5° C. However, for convenience, TDS may be calculated by conversion from practical salinity unit (S).

Next, our elements and methods are further described by referring to some Examples which by no means limit the scope of this disclosure.

(Height Difference of the Surface of the Separation Membrane on the Permeate Water Side)

The permeate water side of the separation membrane cut to the size of 5 cm×5 cm was measured for the difference in the height between the projections and the depressions using high precision profilometer system KS-1100 manufactured by KEYENCE Corporation, and the average height difference was calculated. The average was calculated by measuring the points with at least 10 μm height difference, summing the height measured, and dividing the sum by the number of points measured.

(Desalination Rate (Removal Rate of TDS))

The desalination rate (removal rate of TDS) was determined by the following formula:

Removal rate of TDS (%)=100×{1−(TDS concentration of the permeate water/TDS concentration of the feed water)}

A notation was added when difference of 0.1% or more was noted between the measurement after 1 hour and the measurement after 8 hours.

(Amount of Water Produced)

Amount of feed water (brackish water) permeated through the spiral separation membrane element was measured for the case wherein the sodium chloride content of the feed water was 500 mg/L, the operation pressure was 0.7 MPa, and the operation temperature was 25° C. The amount of permeate water (cubic meter) permeated per day through the spiral separation membrane element was used as the amount of water produced (m$^3$/day). A notation was added when difference of 1 m$^3$/day or more was noted between the measurement after 1 hour and the measurement after 8 hours.

(Recovery Rate of the Separation Membrane Pair)

The spiral separation membrane element was immersed in water, and compressed air (0.3 MPa) was supplied to the element. The case with the air bubble generation of 3 minutes or more was regarded leakage. The number of the separation membrane pairs exhibiting the leakage was counted, and the recovery rate was determined by (the number of the separation membrane pair exhibiting air leakage/the number of separation membrane pairs evaluated).

EXAMPLE 1

On a nonwoven fabric comprising polyethylene terephthalate fiber (fiber diameter, 1 decitex) having a thickness of about 90 μm and air permeability of 1 cc/cm$^2$/sec, a 15.0% by weight DMF solution of polysulfone was cast at a thickness of 180 μm at room temperature (25° C.). Immediately after the casting, the fabric was immersed in pure water and left for 5 minutes to prepare a roll of porous support membrane (thickness, 130 μm) comprising a fiber-reinforced polysulfone support membrane.

Subsequently, the porous support membrane was supplied from the porous support membrane roll, and an aqueous solution of 1.8% by weight of m-PDA and 4.5% by weight of ε-caprolactam was coated on the polysulfone surface. After spraying nitrogen from an air nozzle to remove excessive aqueous solution from the support membrane surface, a n-hexane solution at 25° C. containing 0.06% by weight of trimesic chloride was coated to fully wet the surface. After removing excessive solution from the membrane by blowing air and washing the membrane with a hot water at 50° C., the membrane was immersed in 3.5% aqueous solution of glycerin for 1 minute and treated in a hot air oven at 100° C. for 1 minute to thereby obtain a semi-dried separation membrane roll.

Next, an ethylene—vinyl acetate copolymer resin (product name: 703A manufactured by TEX YEAR INDUSTRIES INC.) was hot-melted and coated on the opposite end portions of the surface (on the feed water side) of the separation membrane of the separation membrane roll to form dots having a diameter of 1.0 mm and a height of 400 µm at a pitch of 7.0 mm in the form of a grid having a width of 50 mm.

The resulting 2 separation membranes (each separation membrane having an area defined by a width W2 of the separation membrane in the axial direction of the water collection tube of 300 mm and a length L of the separation membrane in the direction perpendicular to the axial direction of the water collection tube of 955 mm) were arranged so that the surfaces on the side of the feed water oppose each other, and the separation membranes were adhered in the area at a width W1 of 10 mm by using an adhesive (product name: KEMIT R-248 manufactured by Toray Fine Chemicals Co., Ltd.) for the sealing material to thereby prepare a separation membrane pair.

Next, a tricot (having a thickness of 300 µm, a groove width of 200 µm, a ridge width of 300 µm, and a groove depth of 105 µm) was disposed on the surface of the separation membrane on the side of the permeate water as a channel material. The separation membranes were cut, and disposed one on another so that the side of the feed water opposes each other to thereby prepare a separation membrane pair having the channel material provided on the side of the permeate water side. The separation membrane pair had an effective area of 1.0 m², and a length L of the membrane in the direction perpendicular to the axial direction of the water collection tube of 930 mm. Horizontal direction between the highest point of the separation membrane on the side of the permeate water to the highest point of the adjacent high area was measured for 200 membranes, and the average was used as the pitch.

Next, the separation membrane pairs were wound around the water collection tube starting from the edge of the channel material on the side of the permeate water to thereby prepare a spiral separation membrane element having 26 separation membrane pairs spirally wound around the water collection tube. A film was wound on the exterior surface of the resulting wound body, and the film was secured by a tape. After cutting the edges, the end plates were fitted on the edges and filament winding was conducted to obtain a 2 inch element.

When the resulting element was placed in a pressure vessel, and the operation was conducted at a sodium chloride content of the feed water of 500 mg/L, an operation pressure of 0.7 MPa, an operation temperature 25° C., and a pH of 7 (recovery rate, 15%), amount of the water produced and the desalination rate were respectively 0.81 m3/day and 98.7%, and the recovery rate of the separation membrane pair was 99.4%.

Process conditions and performance of the elements are shown in Table 1.

EXAMPLE 2

In Example 2, the separation membrane roll was produced by repeating the procedure of Example 1 except that the space between the dots provided at opposite edge portions was embossed. A 2 inch element was produced by repeating the procedure of Example 1, and the element was operated under the same conditions as the Example 1. The amount of the water produced and the desalination rate were respectively 0.79 m³/day and 97.9%, and the recovery rate of the separation membrane was 99.1%. The conditions used for providing the height difference on the separation membrane and performance of the elements are shown in Table 1.

EXAMPLE 3

In Example 3, the separation membrane roll was produced by repeating the procedure of Example 1 except that an ethylene—vinyl acetate copolymer resin (product name: 703A manufactured by TEX YEAR INDUSTRIES INC.) was hot-melted on the separation membrane to form dots having a height of 230 µm to provide a height difference on the permeate water side of the separation membrane (dot formation), instead of using the tricot. A 2 inch element was produced by repeating the procedure of Example 1, and the element was operated under the same conditions as the Example 1. The amount of the water produced and the desalination rate were respectively 0.82 m³/day and 98.5%, and the recovery rate of the separation membrane was 99.2%. The conditions used for providing the height difference with the surface of the separation membrane and performance of the elements are shown in Table 1.

EXAMPLE 4

In Example 4, the separation membrane roll was produced by repeating the procedure of Example 1 except that width W1 of the sealing material was 90 mm. A 2 inch element was produced by repeating the procedure of Example 1, and the element was operated under the same conditions as the Example 1. The amount of the water produced and the desalination rate were respectively 0.73 m³/day and 98.8%, and the recovery rate of the separation membrane was 99.5%%. The processing conditions of the separation membrane and performance of the elements are shown in Table 1.

EXAMPLE 5

In Example 5, the separation membrane roll was produced by repeating the procedure of Example 1 except that a hot-melting was not conducted at the opposite edge portions of the surface on the side of the feed water of the separation membrane of the separation membrane roll, and a net was used for the channel material. A 2 inch element was produced by repeating the procedure of Example 1, and the element was operated under the same conditions as the Example 1. The amount of the water produced and the desalination rate were respectively 0.75 m³/day and 98.8%, and the recovery rate of the separation membrane was 99.0%. The processing conditions of the separation membrane and performance of the elements are shown in Table 1.

EXAMPLE 6

In Example 6, the separation membrane roll was produced by repeating the procedure of Example 5 except that a hot-melting was not conducted at the opposite edge portions of the surface on the side of the feed water of the separation membrane of the separation membrane roll, and a net was used for the channel material. The amount of the water produced and the desalination rate were respectively 0.69 m³/day and 98.9%, and the recovery rate of the separation membrane was 99.2%. The processing conditions of the separation membrane and performance of the elements are shown in Table 2.

Comparative Example 1

In Comparative Example 1, the separation membrane roll was prepared by fully repeating the procedure of Example 1. A 2 inch element was produced by repeating the procedure of Example 1 except that the step of cutting was conducted by the conventional folding cutting, and the element was operated under the same conditions as the Example 1. The amount of the water produced and the desalination rate were respectively 0.82 m³/day and 98.0%, and the recovery rate of the separation membrane was 94.5%. The conditions used for providing the height difference with the surface of the separation membrane and performance of the elements are shown in Table 2.

Comparative Example 2

In Comparative Example 2, the separation membrane roll was prepared by fully repeating the procedure of Example 1. A 2 inch element was produced by repeating the procedure of Example 1 except that the step of cutting was conducted by the conventional folding cutting, and a net (having a thickness of 900 µm and a pitch of 3 mm×3 mm) was used for the channel material on the side of the feed water of the separation membrane, and the element was operated under the same conditions as the Example 1. The amount of the water produced and the desalination rate were respectively 0.74 m³/day and 98.8%, and the recovery rate of the separation membrane was 93.6%. The conditions used to provide the height difference on the separation membrane and performance of the elements are shown in Table 2.

Comparative Example 3

In Comparative Example 3, the separation membrane roll was prepared by fully repeating the procedure of Example 1. A 2 inch element was produced by repeating the procedure of Example 1 except that the step of cutting was conducted by hot pressing (double side pressing at a pressure of 1.0 MPa and a temperature of 250° C.), and the element was operated under the same conditions as the Example 1. The amount of the water produced and the desalination rate were respectively 0.85 m³/day and 85.0%, and the recovery rate of the separation membrane was 15.6%. The conditions used to provide the height difference on the separation membrane and performance of the elements are shown in Table 2.

Comparative Example 4

In Comparative Example 4, the separation membrane roll was prepared by fully repeating the procedure of Example 1. A 2 inch element was produced by repeating the procedure of Example 1 except that the step of cutting was conducted by using a pressure sensitive tape, and the element was operated under the same conditions as the Example 1. The amount of the water produced and the desalination rate were respectively 0.83 m³/day and 67.2%, and the recovery rate of the separation membrane was 7.5%. The conditions used to provide the height difference on the separation membrane and performance of the elements are shown in Table 2.

As described above, the spiral separation membrane element has high water production performance, improved stability in the operation, as well as excellent removal performance.

TABLE 1

| | | | Example 1 | Example 2 | Example 3 | Example 4 | Example 5 |
|---|---|---|---|---|---|---|---|
| Feed water side | Edge area | Channel material | — | — | — | — | Net |
| | | Method for providing the height difference | HM | HM | HM | HM | — |
| | | Height difference (µm) | 400 | 400 | 400 | 400 | — |
| | | Groove width (mm) | 5.0 | 5.0 | 5.0 | 5.0 | — |
| | | Pitch (mm) | 7.0 | 7.0 | 4.0 | 4.0 | — |
| | | Projection area percentage (%) | 0.016 | 0.016 | 0.016 | 0.016 | — |
| | Area other than the edge area | Method for providing the height difference | — | EB | — | — | — |
| | | Embossed pattern | — | Net pattern | — | — | — |
| | | Embossing temperature (° C.) | — | 130 | — | — | — |
| | | Linear load (kg/cm) | — | 60 | — | — | — |
| | | Height difference (µm) | — | 400 | — | — | — |
| | | Groove width (mm) | — | 1 | — | — | — |
| | | Pitch (mm) | — | 3 | — | — | — |
| | | Projection area percentage (%) | — | 65 | — | — | — |
| Permeate water side | | Channel material | Tricot | Tricot | | Tricot | Tricot |
| | | Method for providing the height difference | — | — | HM | — | — |
| | | Height difference (µm) | — | — | 230 | — | — |
| | | Groove width (mm) | — | — | 1 | — | — |
| | | Pitch (mm) | — | — | 3 | — | — |
| | | Projection area percentage (%) | — | — | 65 | — | — |

TABLE 1-continued

|  |  | Example 1 | Example 2 | Example 3 | Example 4 | Example 5 |
|---|---|---|---|---|---|---|
| Width of the sealing material (mm) | | 10 | 10 | 10 | 90 | 10 |
| Production method of the separation membrane envelope | | Cutting (no folding) | Cutting (no folding) | Cutting (no folding) | Cutting (no folding) | Cutting (no folding) |
| Performance of the element | Amount of water produced (m³/day) | 0.81 | 0.79 | 0.82 | 0.73 | 0.75 |
| | Desalination rate (%) | 98.7 | 97.9 | 98.5 | 98.8 | 98.8 |
| | Recovery rate (%) | 99.4 | 99.1 | 99.2 | 99.5 | 99.0 |

HM: hot melt processing,
EB: embossing

TABLE 2

| | | | Example 6 | Comparative Example 1 | Comparative Example 2 | Comparative Example 3 | Comparative Example 4 |
|---|---|---|---|---|---|---|---|
| Feed water side | Edge area | Channel material | Net | — | Net | — | — |
| | | Method for providing the height difference | — | HM | — | HM | HM |
| | | Height difference (μm) | — | 400 | — | 400 | 400 |
| | | Groove width (mm) | — | 5.0 | — | 5.0 | 5.0 |
| | | Pitch (mm) | — | 7.0 | — | 7.0 | 7.0 |
| | | Projection area percentage (%) | — | 0.016 | — | 0.016 | 0.016 |
| | Area other than the edge area | Method for providing the height difference | — | — | — | EB | EB |
| | | Embossed pattern | — | — | — | Net pattern | Net pattern |
| | | Embossing temperature (° C.) | — | — | — | 130 | 130 |
| | | Linear load (kg/cm) | — | — | — | 60 | 60 |
| | | Height difference (μm) | — | — | — | 400 | 400 |
| | | Groove width (mm) | — | — | — | 1 | 1 |
| | | Pitch (mm) | — | — | — | 3 | 3 |
| | | Projection area percentage (%) | — | — | — | 65 | 65 |
| Permeate water side | | Channel material | Tricot | Tricot | Tricot | Tricot | Tricot |
| | | Method for providing the height difference | — | — | — | — | — |
| | | Height difference (μm) | — | — | — | — | — |
| | | Groove width (mm) | — | — | — | — | — |
| | | Pitch (mm) | — | — | — | — | — |
| | | Projection area percentage (%) | — | — | — | — | — |
| Width of the sealing material (mm) | | | 90 | — | — | 10 (width of the hot pressing) | 10 (width of the adhesive tape) |
| Production method of the separation membrane envelope | | | Cutting (no folding) | Folding and cutting | Folding and cutting | Hot pressing | Adhesive tape |
| Performance of the element | Amount of water produced (m³/day) | | 0.69 | 0.82 | 0.74 | 0.85 | 0.83 |
| | Desalination rate (%) | | 98.9 | 98.0 | 98.8 | 85.0 | 67.2 |
| | Recovery rate (%) | | 99.2 | 94.5 | 93.6 | 15.6 | 7.5 |

HM: hot melt processing,
EB: embossing

INDUSTRIAL APPLICABILITY

The spiral separation membrane element of the invention is particularly adapted for use in desalination of brackish water and sea water.

The invention claimed is:

1. A spiral separation membrane element comprising:
    a wound body having a spirally wound separation membrane,
    a raw fluid channel provided along one surface of the separation membrane,
    a permeate fluid channel provided along another surface of the separation membrane, and
    a permeate fluid collection tube; wherein
    the raw fluid channel is closed to the permeate fluid collection tube, and the permeate fluid channel is open to the permeate fluid collection tube,
    the separation membrane is wound around the permeate fluid collection tube to form the wound body,
    raw fluid is supplied to the raw fluid channel from one end of the wound body,
    concentrate fluid not permeating through the separation membrane is discharged from the other end of the wound body, and
    permeate fluid permeating through the separation membrane is discharged from the permeate fluid collection tube, wherein
    the spiral separation membrane element has at least two separation membrane pairs, and a surface in contact with the raw fluid of one separation membrane opposes a surface in contact with the raw fluid of the adjacent separation membrane to form the raw fluid channel, and the raw fluid channel between the edge portions on the side of the permeate fluid collection tube is closed by a sealing material provided on the edge portions of the separation membranes,
    the wound body is formed by spirally winding each separation membrane pair around the permeate fluid collection tube,
    the sealing material has a width in a direction perpendicular to the axial direction of the permeate fluid collection tube of 5 mm to 100 mm and is disposed between the surface in contact with the raw fluid of one separation membrane and the surface in contact with the raw fluid of an adjacent separation membrane, and
    the one separation membrane and the adjacent separation member are directly adhered to each other by the sealing material.

2. The spiral separation membrane element according to claim 1, wherein the sealing material has a thickness of 5 μm to 500 μm.

3. The spiral separation membrane element according to claim 2, wherein the raw fluid channel is formed by projections and depressions formed on a surface of the separation membrane or a channel material provided along a surface of the separation membrane.

4. The spiral separation membrane element according to claim 1, wherein the raw fluid channel is formed by projections and depressions formed on a surface of the separation membrane or a channel material provided along a surface of the separation membrane.

5. The spiral separation membrane element according to claim 4, wherein difference in height between the projections and the depressions formed on the surface of the separation membrane or thickness of the channel material provided along the surface of the separation membrane is 80 μm to 1000 μm.

6. The spiral separation membrane element according to claim 1, wherein the raw fluid channel is formed by projections and depressions formed on a surface of the separation membrane or a channel material provided along a surface of the separation membrane.

7. The spiral separation membrane element according to claim 1, wherein the seal material includes a material which can be used as a hot melt adhesive.

8. The spiral separation membrane element according to claim 1, wherein the sealing material is an adhesive.

* * * * *